United States Patent
Hughes et al.

(10) Patent No.: US 12,444,516 B2
(45) Date of Patent: Oct. 14, 2025

(54) DROP-IN MULTI-OPTICS MODULE FOR QUANTUM-PARTICLE CELL

(71) Applicant: ColdQuanta, Inc., Boulder, CO (US)

(72) Inventors: Steven Michael Hughes, Louisville, CO (US); Christopher Robert Sheridan, III, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 442 days.

(21) Appl. No.: 17/959,979

(22) Filed: Oct. 4, 2022

(65) Prior Publication Data

US 2023/0260670 A1  Aug. 17, 2023

Related U.S. Application Data

(60) Provisional application No. 63/333,677, filed on Apr. 22, 2022, provisional application No. 63/252,927, filed on Oct. 6, 2021.

(51) Int. Cl.
*G06N 10/00* (2022.01)
*G21K 1/00* (2006.01)

(52) U.S. Cl.
CPC .............. *G21K 1/00* (2013.01); *G06N 10/00* (2019.01)

(58) Field of Classification Search
None
See application file for complete search history.

(56) References Cited

U.S. PATENT DOCUMENTS

| | | |
|---|---|---|
| 2011/0059330 A1 | 3/2011 | Durney |
| 2018/0233337 A1 | 8/2018 | Hughes |
| 2019/0220770 A1* | 7/2019 | Amini ..................... F04B 37/08 |
| 2020/0402681 A1 | 12/2020 | Anderson |
| 2021/0327605 A1* | 10/2021 | Shen .......................... G02F 1/29 |
| 2021/0362225 A1* | 11/2021 | Yun .......................... B22F 12/90 |
| 2022/0246419 A1* | 8/2022 | Leibrandt ............. H01J 49/424 |
| 2023/0169385 A1 | 6/2023 | Meinert et al. |

FOREIGN PATENT DOCUMENTS

| | | |
|---|---|---|
| BE | 1028131 B1 * | 10/2021 |
| WO | 2020086630 | 4/2020 |

OTHER PUBLICATIONS https://www.youtube.com/watch?v=KbBzXEpePOs (Year: 2020).*

* cited by examiner

*Primary Examiner* — James Choi
(74) *Attorney, Agent, or Firm* — Young Basile Hanlon & MacFarlane, P.C.

(57) ABSTRACT

A drop-in multi-optics module for a quantum-particle (e.g., rubidium, cesium) cell provides for more convenient and cost-effective manufacture of such cells (including vacuum cells, cold/ultra-cold matter cells, vapor cells, and channel cells). In a 3D printing approach, a model of a frame augmented by buffer material is 3D printed. The buffer material is removed from the augmented frame to achieved desired dimensions with greater precision than could be achieved by 3D printing the frame directly. Optical and, in some cases, other components are attached to the frame to realize the multi-optics drop-in module. Alternatively, the module can be formed by cutting out portions of a metal sheet and then folding the resulting 2D preform.

20 Claims, 16 Drawing Sheets

Augmented Model 400

Frame Model 406

Buffer Model 408

3D PRINTER 404

Augmented Frame 402

Buffer 410

Augmented Model 400

Frame Model 406

Buffer Model 408

3D PRINTER 404

Augmented Frame 402

Buffer 410

Augmented Frame 402

Buffer 410

Automated Milling Machine 600

Frame 228

Augmented Frame 402

Buffer 410

⇓

Automated Milling Machine 404

⇓

Frame 228

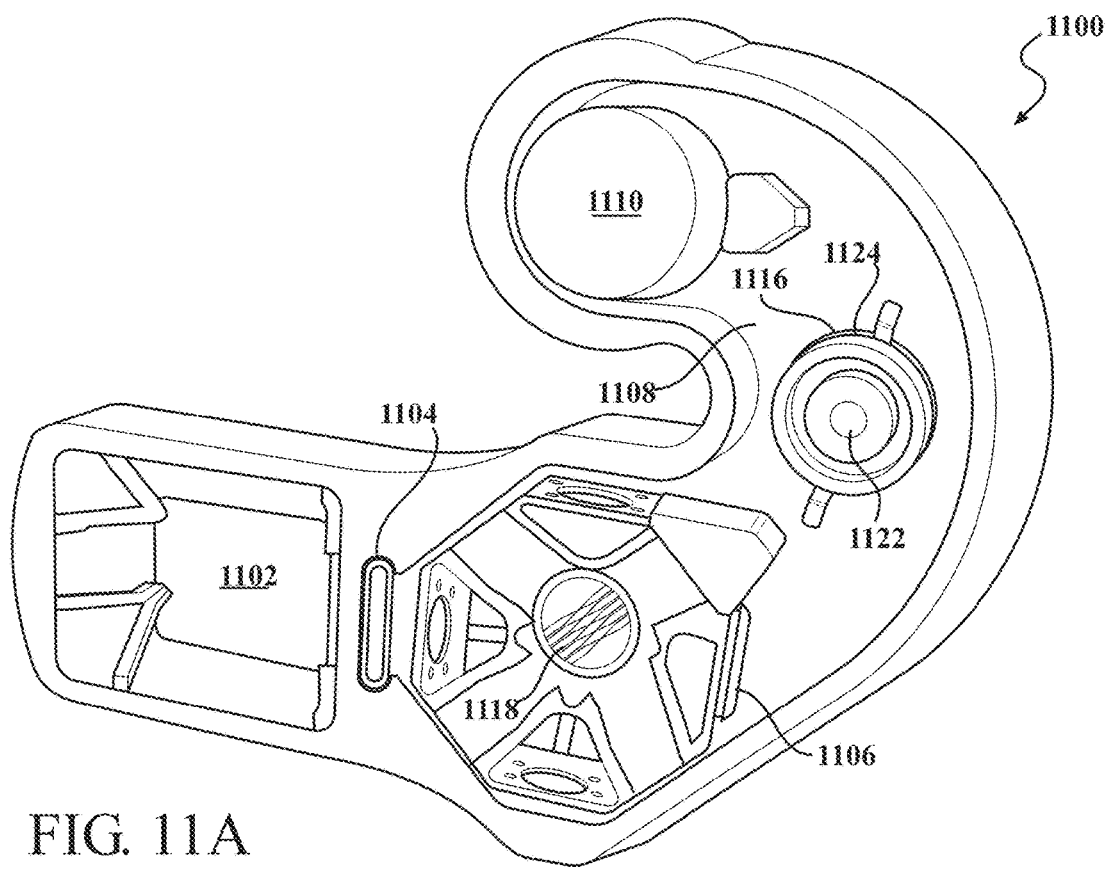
FIG. 11A
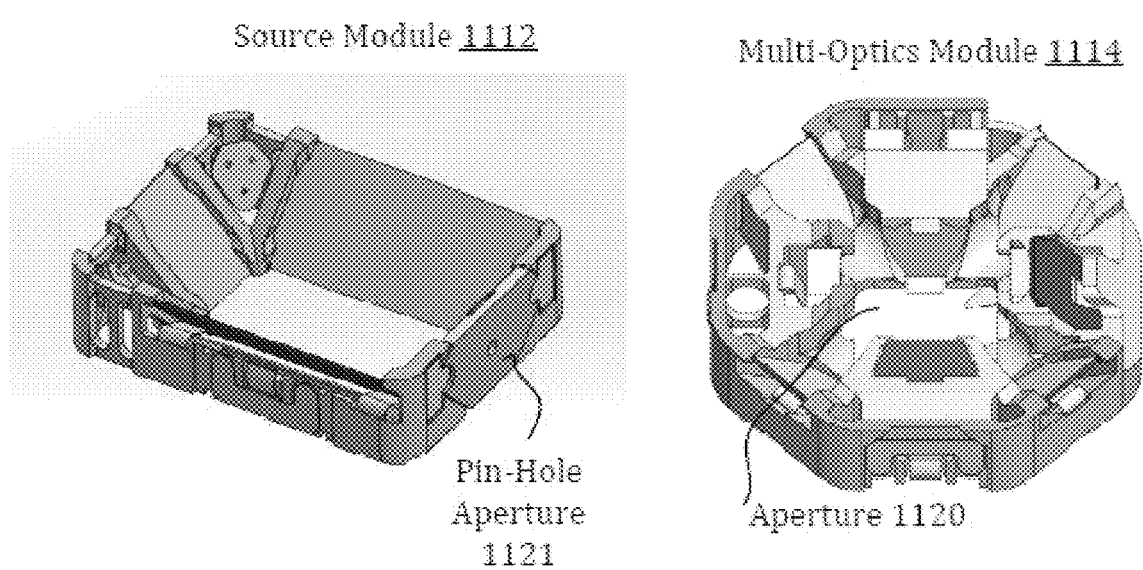
FIG. 11B
FIG. 11C

DROP-IN MULTI-OPTICS MODULE FOR QUANTUM-PARTICLE CELL

CROSS REFERENCE TO OTHER APPLICATIONS

This application claims priority to U.S. Provisional Patent Application No. 63/252,927 entitled UHV COMPATIBLE DROP-IN PRE-ALIGNED COMPONENT MODULES filed Oct. 6, 2021, and U.S. Provisional Patent Application No. 63/333,677 entitled 3D PRINTED FRAME BUFFER filed Apr. 22, 2022, both of which are incorporated herein by reference for all purposes.

GOVERNMENT RIGHTS

This invention was made with government support under grant number 80NSSC19C0081 awarded by NASA. The government has certain rights in the invention.

BACKGROUND OF THE INVENTION

Quantum particle cells (including vacuum cells, cold/ultra-cold matter cells, vapor cells, and channel cells) provide hermetically sealed environments for the study and exploitation of quantum phenomena such as superposition and entanglement. The quantum particles, e.g., neutral or charged atoms or molecules, can be controlled using lasers located outside the cell, which, accordingly, can have transparent walls or windows to allow light to enter and exit the cell. In some cases, light must be redirected or otherwise modified (e.g., focused, collimated, diffracted, split, polarized) within the cell. For example, optical and magneto-optical traps can require multiple orthogonal laser beams. To this end, mirrors should be precisely positioned, co-aligned, and attached within the cells to ensure the necessary directivity for the laser beams. However, the challenge of such precision, especially in the confines of a compact quantum-particle cell can contribute to the high cost associated with the finished product. What is needed is a more efficient and reliable process for incorporating precision optical elements within a quantum-particle cell.

BRIEF DESCRIPTION OF THE DRAWINGS

Various embodiments of the invention are disclosed in the following detailed description and the accompanying drawings.

FIG. 11A is a top perspective view of an open quantum-particle cell including drop in modules for a two-dimensional magneto-optical trap (2D MOT) and a three-dimensional magneto-optical trap (3D MOT).

FIG. 11B is a perspective view of the 2D MOT drop in module.

FIG. 11C is a perspective view of the 3D MOT drop-in module.

DETAILED DESCRIPTION

The present invention provides for a drop-in multi-optics module for a laser-controllable quantum particle cell. Optical elements (e.g., mirrors, lenses) can be aligned relative to each other while the module is outside the cell interior, facilitating such alignment relative to approaches that require alignment of optical elements individually as they are attached within the cell interior. Alignment of the optical element relative to the cell can be achieved by precisely matching and locating module dimensions to cell interior dimensions.

In a 3D-printing aspect, the invention provides for 3D printing a frame and then attaching optical elements to the frame. This approach can require precise positioning of optical element attachment sites on the frame and precise dimensioning of the frame to corresponding cell interior dimensions. In cases in which the employed 3D printer cannot achieve the desired precision (e.g., because of limited printing resolution), an augmented frame can be printed and then precisely machined to specifications. In an alternative "folding" approach, sheet metal can be cut to define planar (2D) preforms that can be folded to define 3D shapes for modules or for frames to which optics can be attached.

Figure 1:
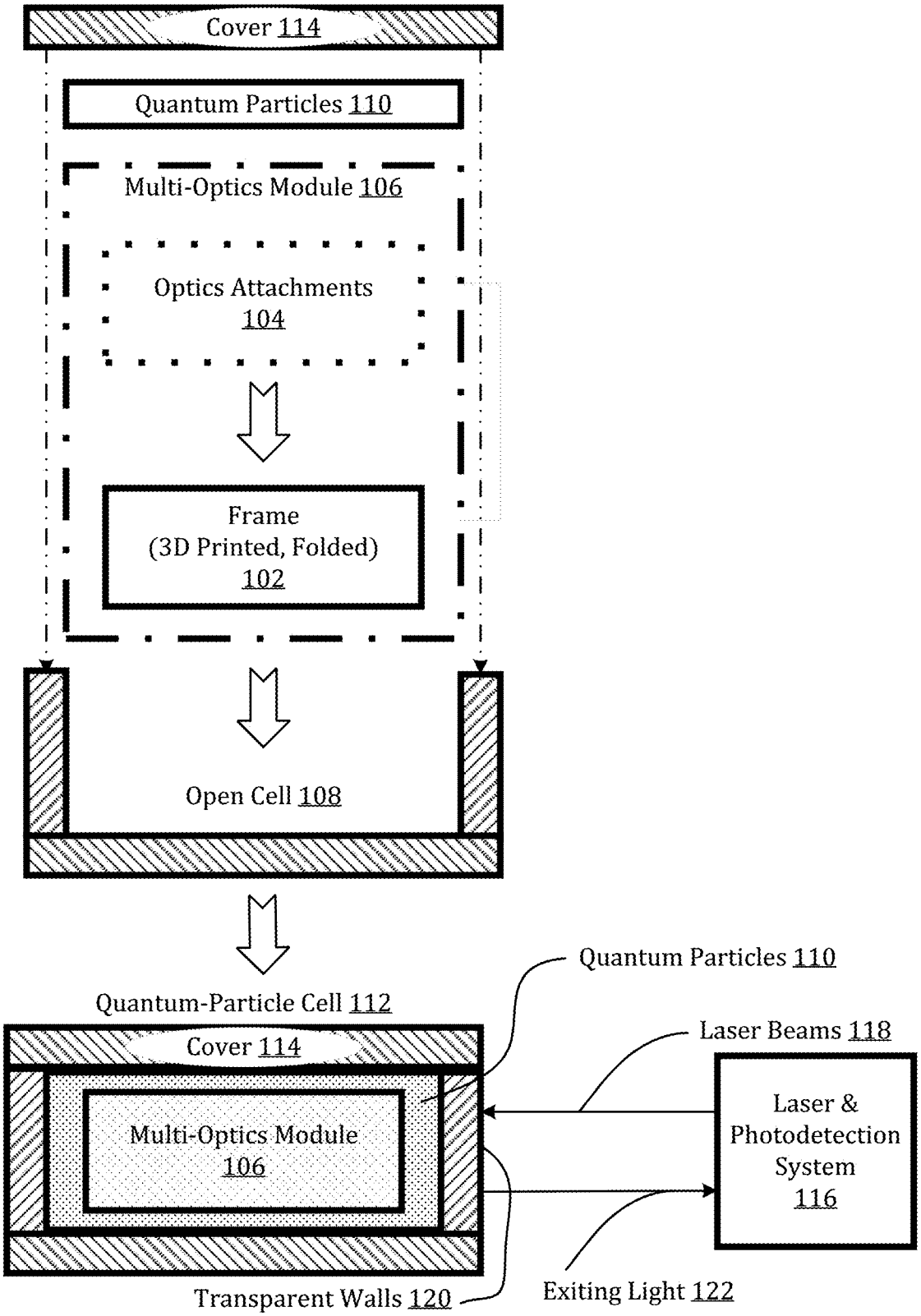
FIG. 1 is a schematic flow diagram of a process for manufacturing a quantum-particle cell using a drop-in multi-optics module.

For example, in a quantum-particle cell manufacturing process 100, diagrammed in FIG. 1, a frame 102 is formed, e.g., using 3D printing or sheet-metal folding. In the event, the frame does not include them, optics elements 104 can then be attached. The resulting multi-optics module 106 can then be inserted into an open cell 108, that is a structure which defines an interior that is not sealed from an exterior ambient, e.g., because a cover is not in place. A vapor of quantum particles 110 or a quantum-particle source is also introduced into open cell 108, either as part of the drop-in module or separately. Finally, a quantum-particle cell 112 is completed, e.g., by bonding a cover 114 to open cell 108, so that it supports a pressure differential between its interior and an exterior ambient.

The resulting quantum-particle cell 112 can be managed (monitored and controlled) using a laser and photodetection system 116. System 116 generates laser beams 118 that enter cell 112 via its transparent walls or windows 120. Laser beams 118 can be used to heat dispensers, so they release quantum particles as a vapor. Optical attachments 104 of module 106 can modify incoming laser beams; for example, incoming laser beams can be redirected to define an optical trap or to help define a magneto-optical trap to trap or guide quantum particles. Incoming laser beams may further be redirected inside the cell to be incident upon a particle source for heating such that the generated plume or spray of particles is minimally or not incident upon the transmissive window of the cell but only upon the redirecting mirror to prevent "mirroring" of the transparent window, especially for corrosive or low vapor pressure species. In addition, incoming laser beams 118 can be used to at least conditionally cause quantum particles to transition between quantum states. The states and transitions can be monitored using photodetection to track light 122 exiting cell 112 to measure laser-beam absorption and/or quantum-particle fluorescence.

Figure 2:
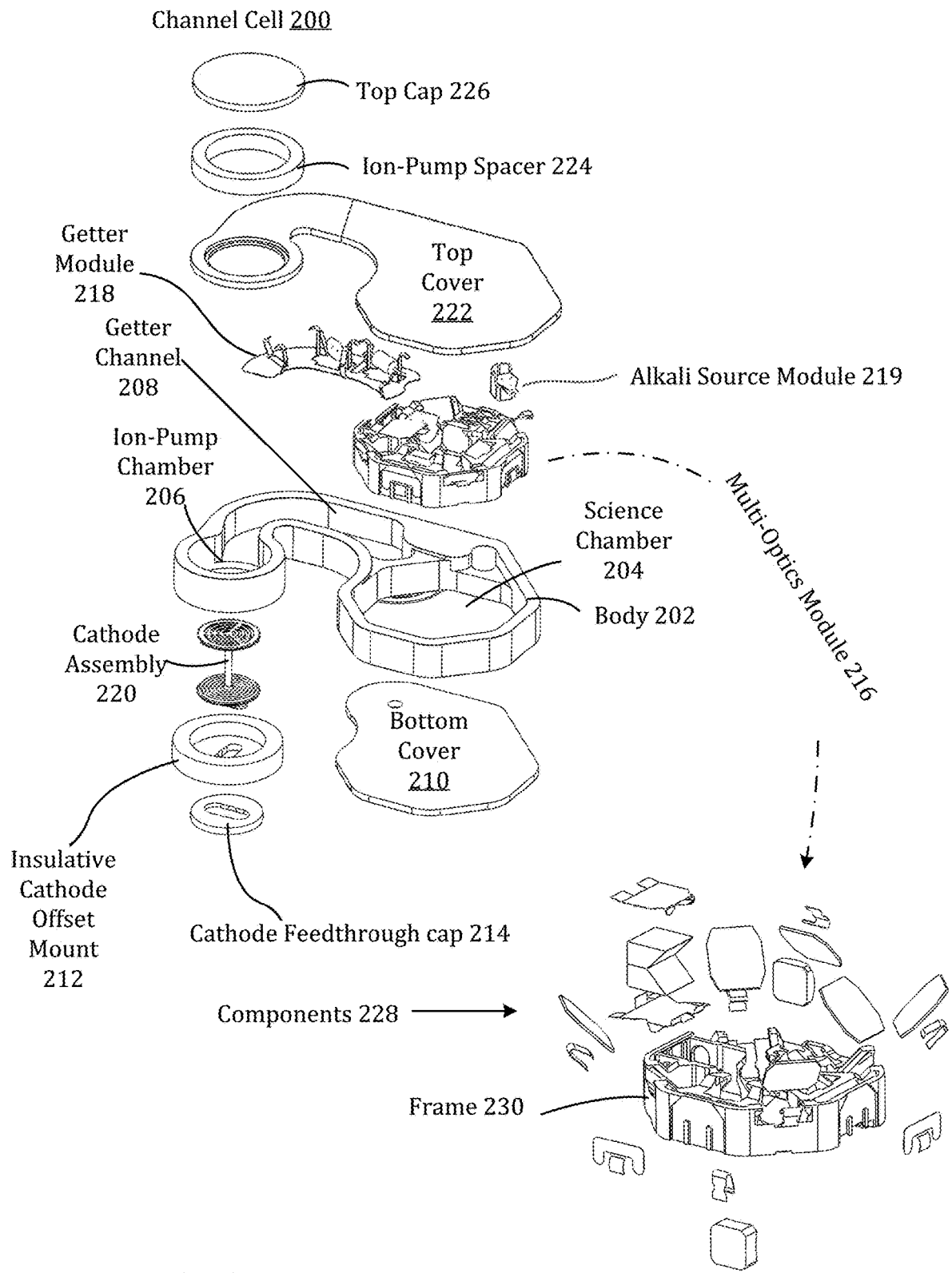
FIG. 2 is an exploded view of the quantum-particle cell manufactured in accordance with the process of FIG. 1 and an exploded view of the drop-in multi-optics module.

A channel cell 200, shown "exploded" in FIG. 2, includes a silicon body 202 in which a science chamber 204, an ion pump chamber 206, and a getter channel 208 connecting the science chamber and the ion pump chamber. A bottom cover 210 and an insulative cathode offset mount 212 can be bonded to body 202, and a cathode feedthrough cap 214 can be bonded to the insulative cathode offset mount 212. A multi-optics module 216, a getter module 218, and a dual-cathode assembly 220 are inserted respectively into science chamber 204, the getter channel 208, and the ion-pump chamber 206. The resulting structure, when properly oriented, could hold liquid under the influence of gravity, but remains an open cell until a top cover 222, an ion-pump spacer 224, and a top cap 226 are bonded in place completing manufacture of channel cell 200.

Figure 3:
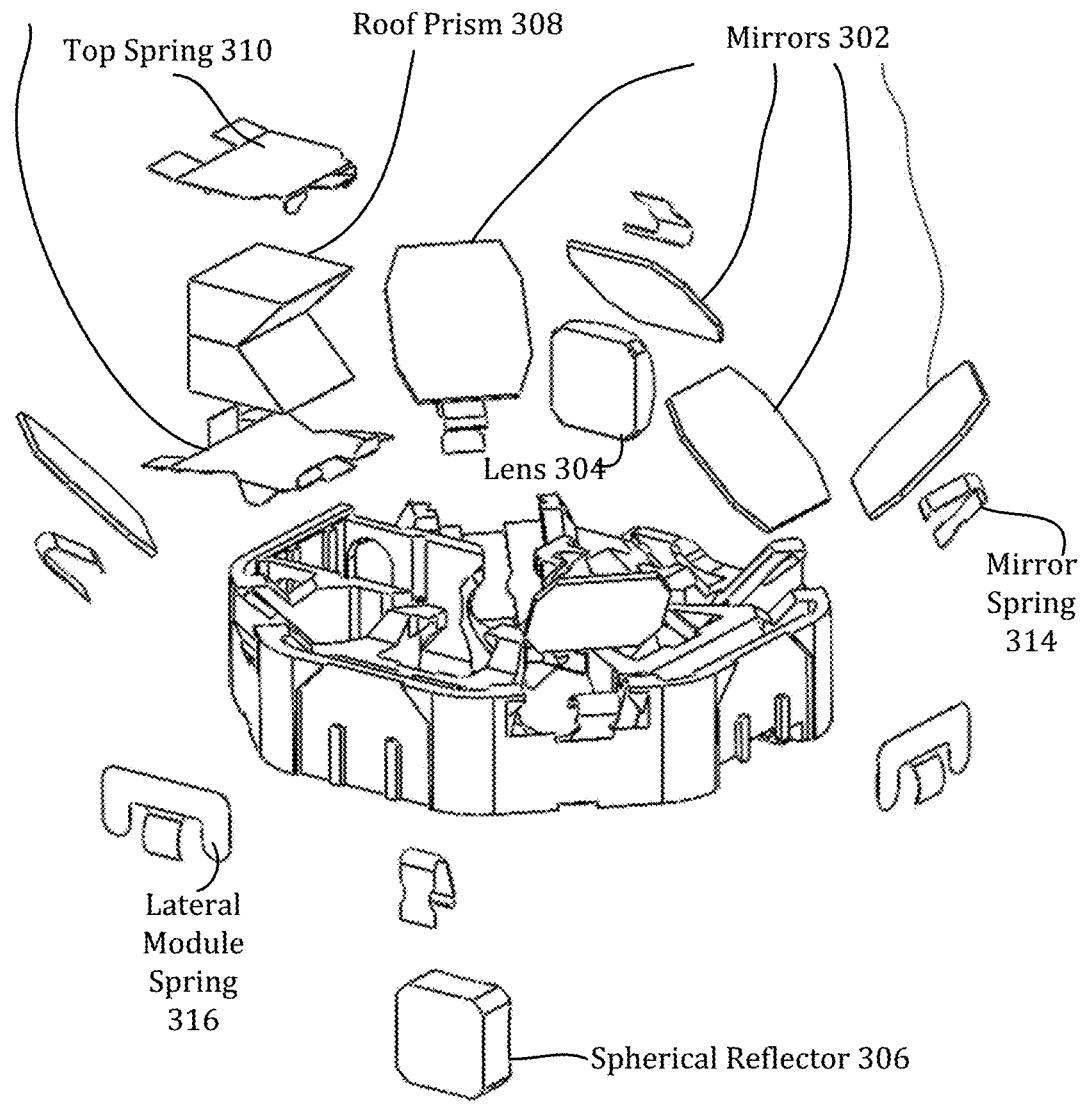
FIG. 3 is an enlarged version of the view of the exploded view of the drop-in multi-optics module of FIG. 2.

Drop-in multi-optics module 216 is shown exploded in the detail of FIG. 2, including components 228 to be attached to frame 230. As shown in FIG. 3, components 228 (FIG. 2) can include mirrors 302, a lens 304, a spherical reflector 306, a roof prism 308, a top spring 310, mirror springs 312 and 314, and lateral module springs 316. Top spring and lateral module springs 310 and 316 provide for positioning module 216 within science chamber 204. Precision alignment is more feasible while the mirrors are outside of cell 200. Accordingly, mirrors 302 can be precisely aligned relative to each other when attached to frame 228 and before module 216 is inserted into science chamber 204.

Figure 4:
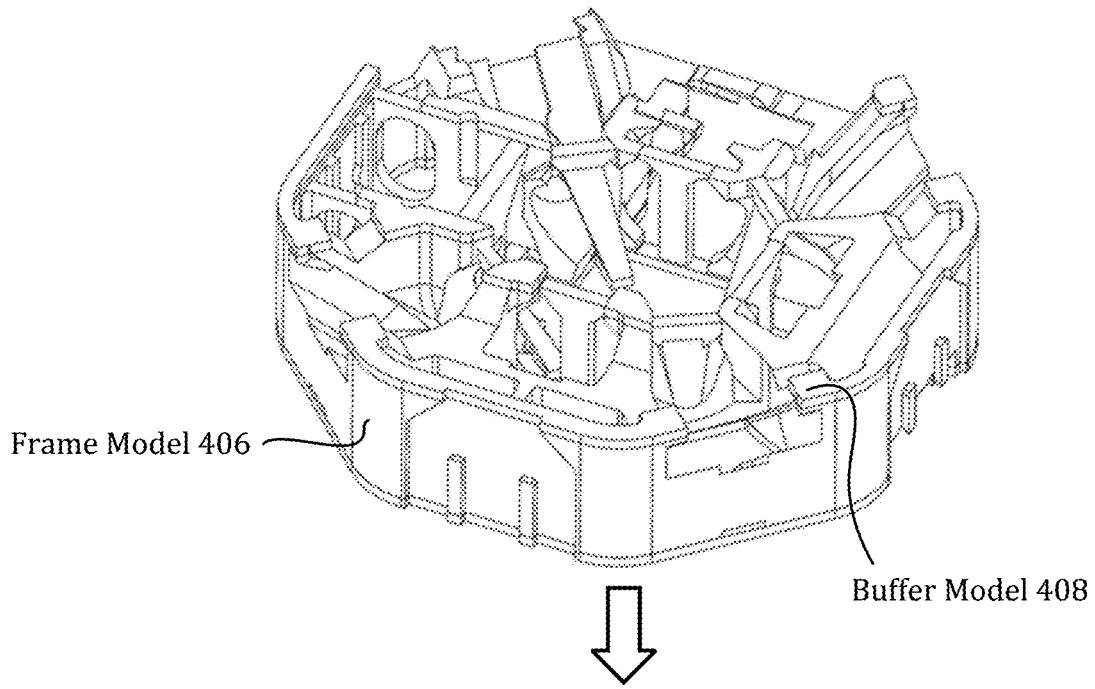
FIG. 4 is a flow diagram of a three-dimensional (3D) printing process for printing an augmented frame of the drop-in module of FIG. 1 shown from a top perspective.
Figure 4:
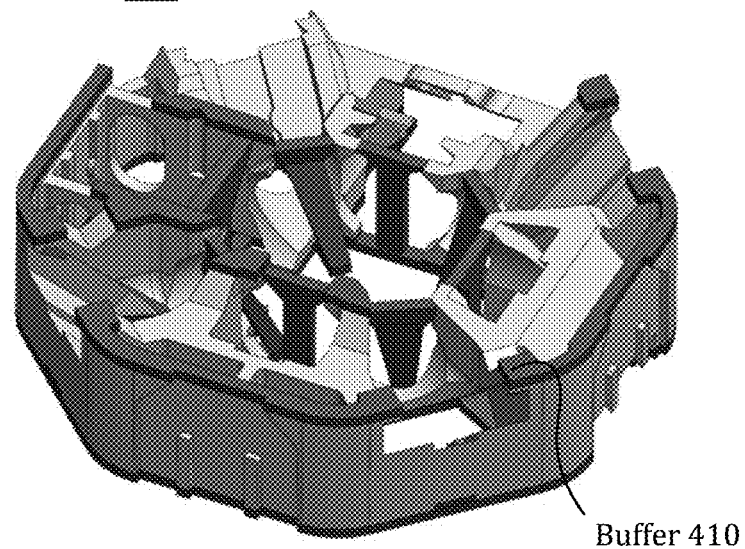

To ensure that mirrors 302, once module 216 is inserted, are precisely aligned with respective to the cell body, the dimensions of multi-optics module 216 can be precisely matched to science chamber dimensions including the spacing between covers 210 and 222. Since the 3D print resolution can be insufficient to ensure a precise match, an augmented frame is 3D printed with excess "buffer" material to ensure that the required module dimensions are met or exceeded. Then, the excess material can be precisely machined to within the desired tolerance. To this end, an "augmented" model 400, represented in FIG. 4, of an augmented frame 402 rather than the desired module frame 228 is input to a 3D printer 404.

Figure 5:
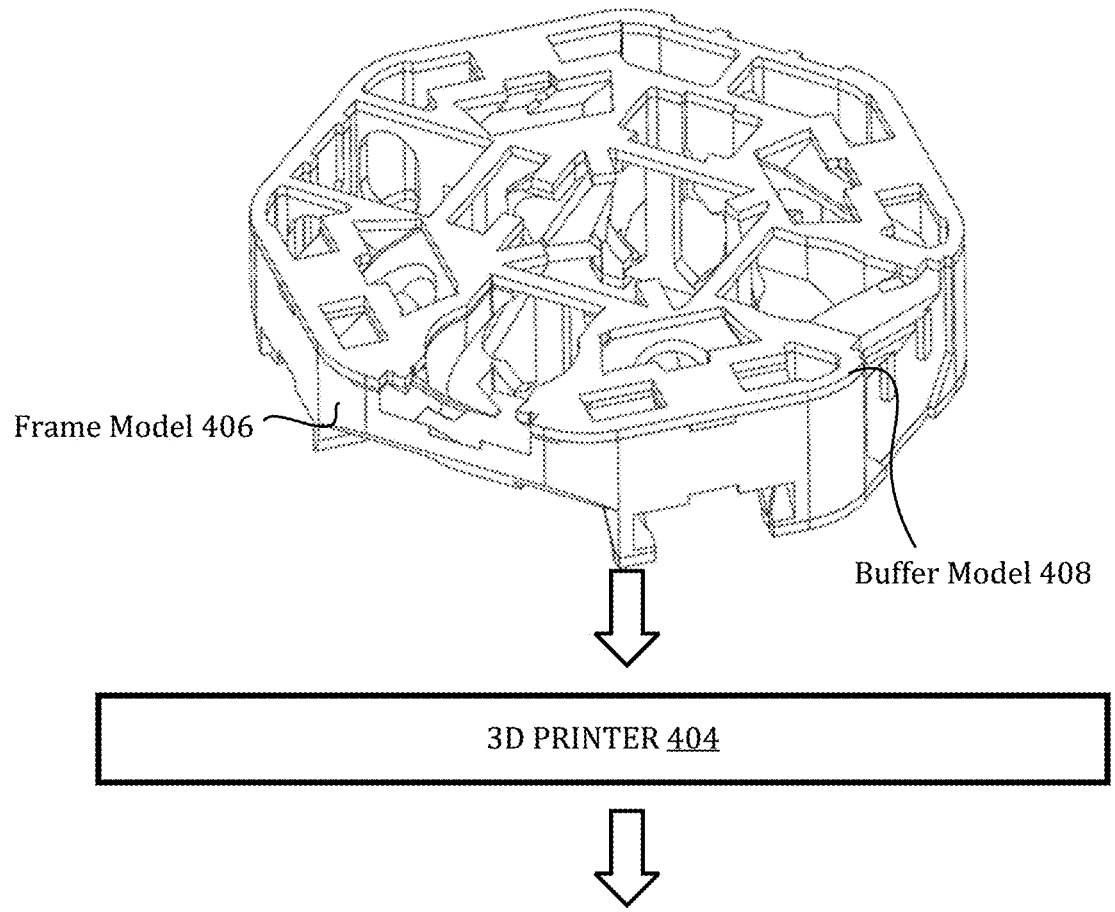
FIG. 5 is a flow diagram of a three-dimensional (3D) printing process for printing an augmented frame of the drop-in module of FIG. 1 shown from a bottom perspective.
Figure 5:
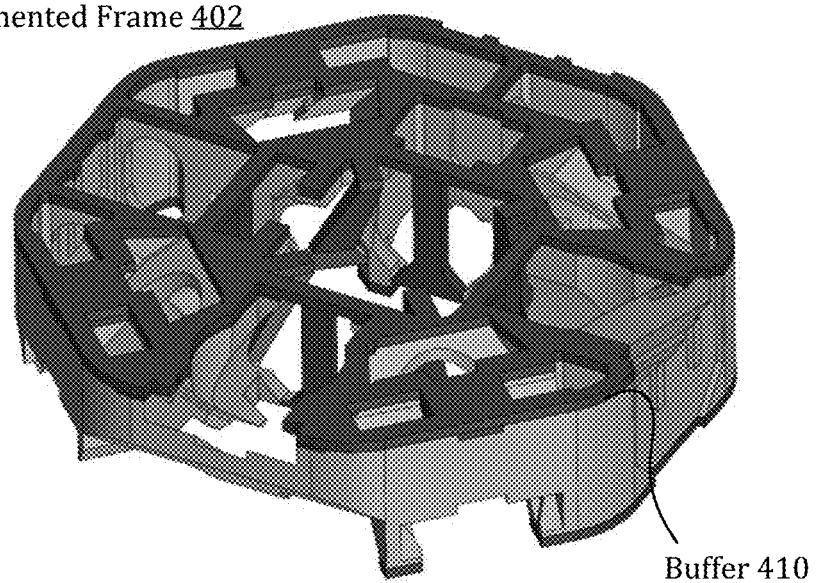
Figure 6:
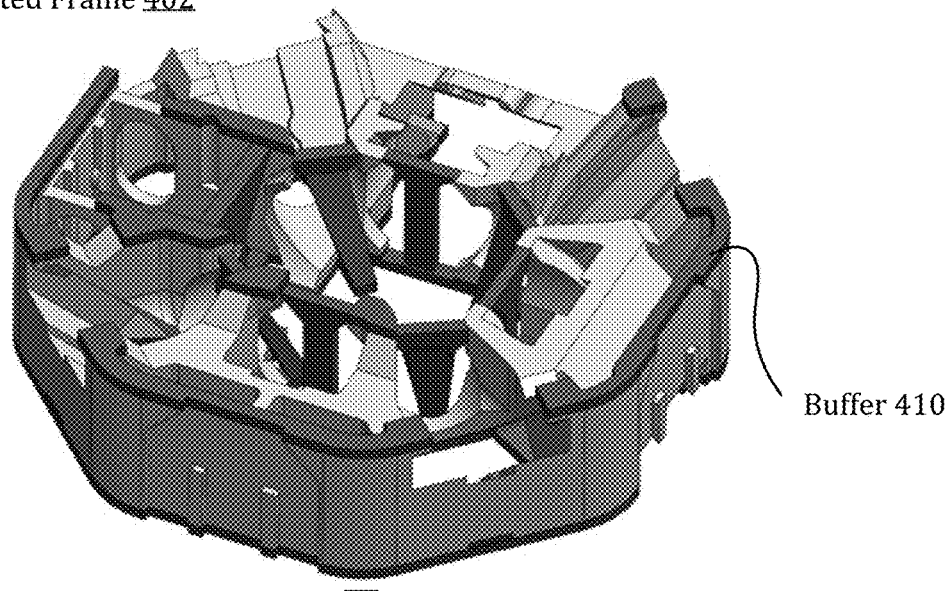
FIG. 6 is a flow diagram of an automated milling process for converting the augmented frame to a 3D frame, which is shown in grey-scale from a bottom perspective.
Figure 6:
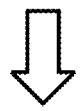
Figure 6:
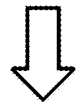
Figure 6:
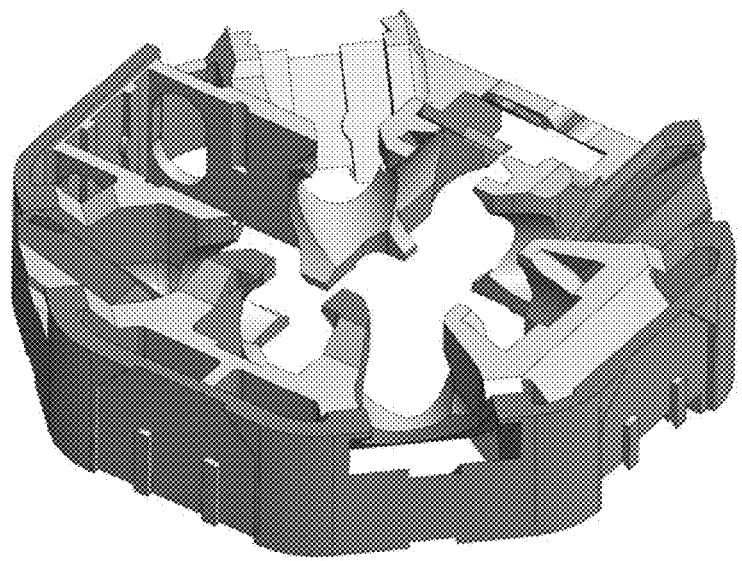
Figure 7:
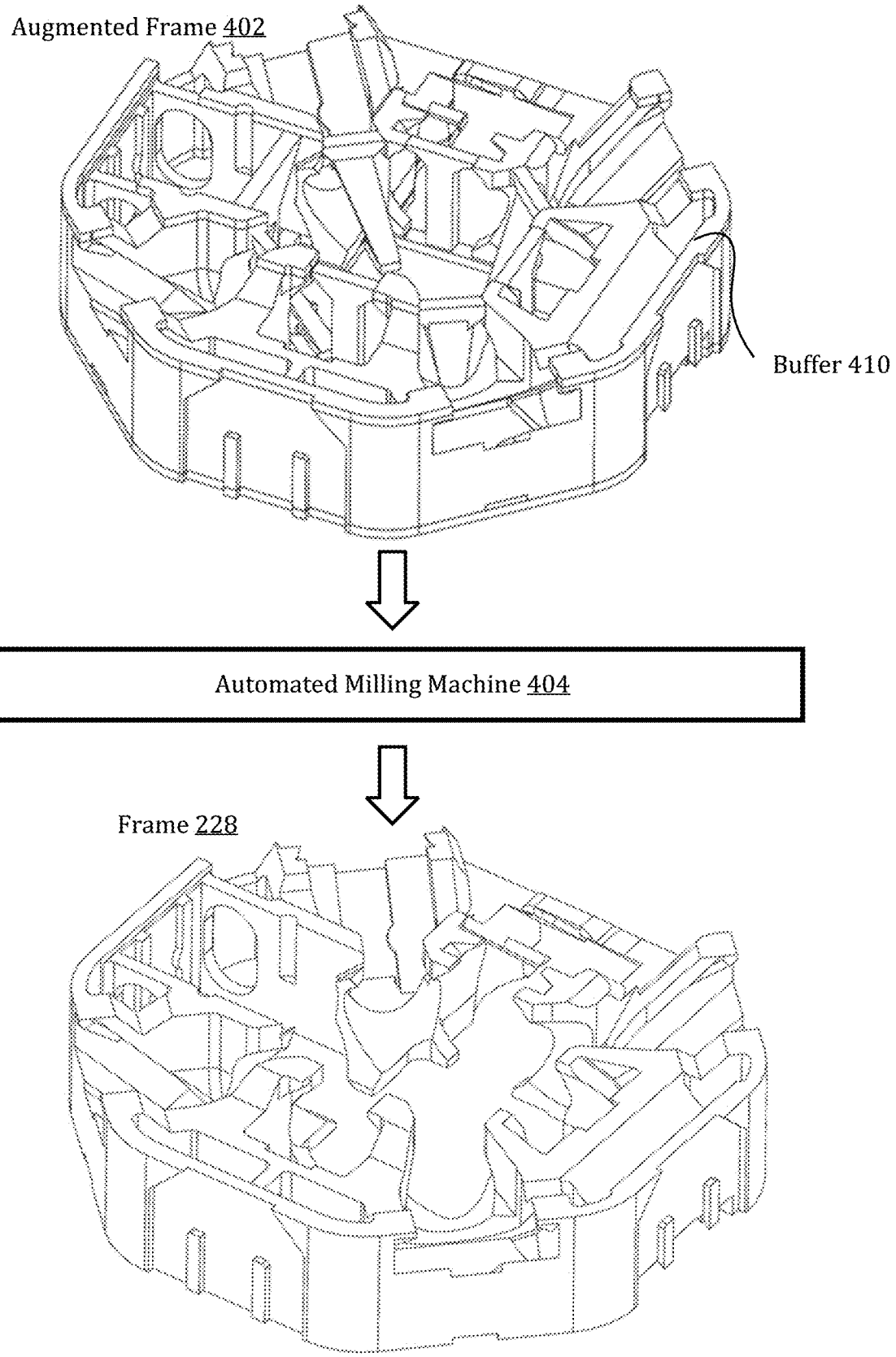
FIG. 7 is a flow diagram of the automated milling process of FIG. 6 for converting the augmented frame to a 3D frame, which is shown in a line drawing from a bottom perspective.
Figure 8:
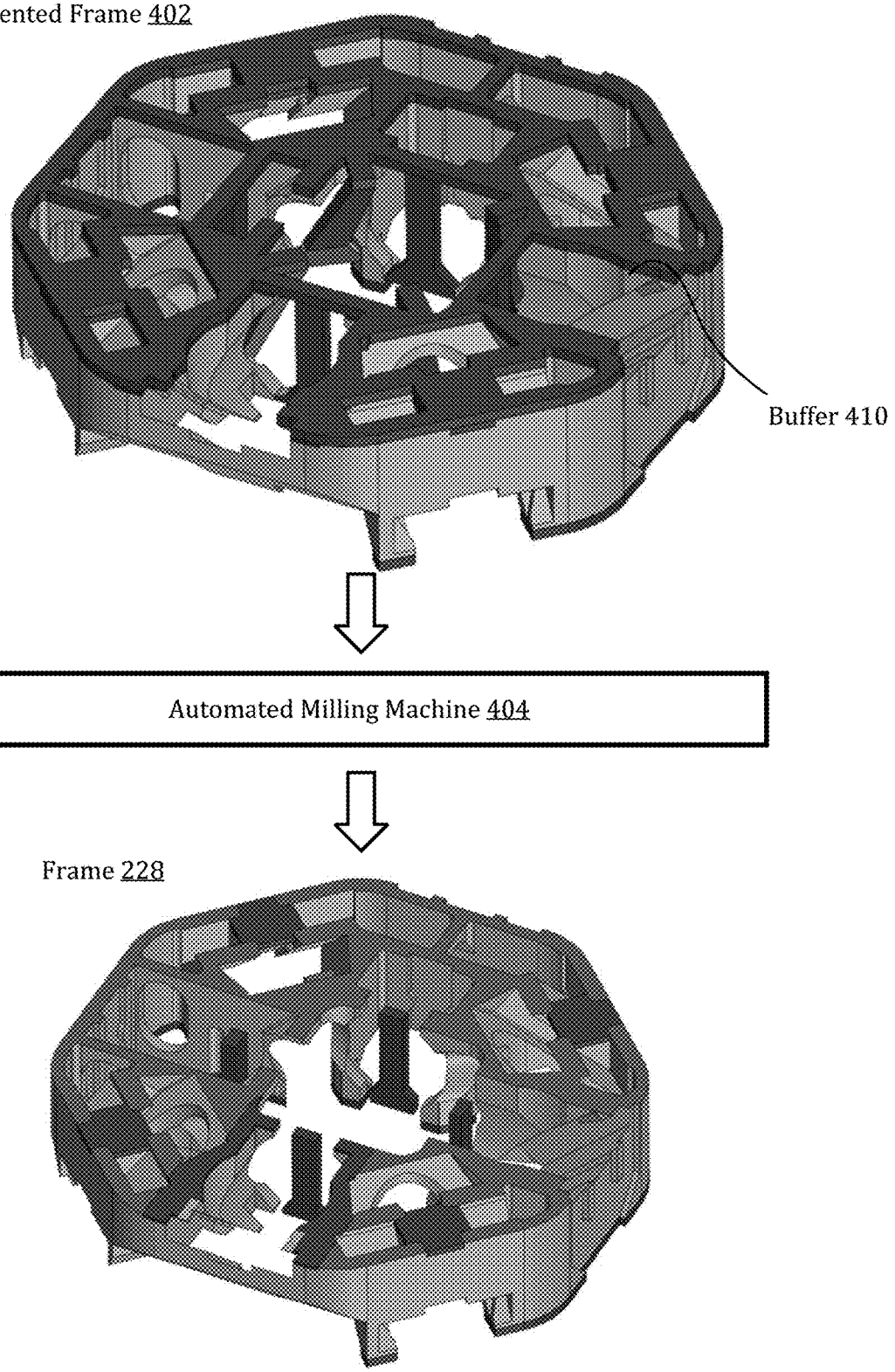
FIG. 8 is a flow diagram of the automated milling process of FIG. 6 for converting the augmented frame to a 3D frame, which is shown in grey scale from a top perspective.
Figure 9:
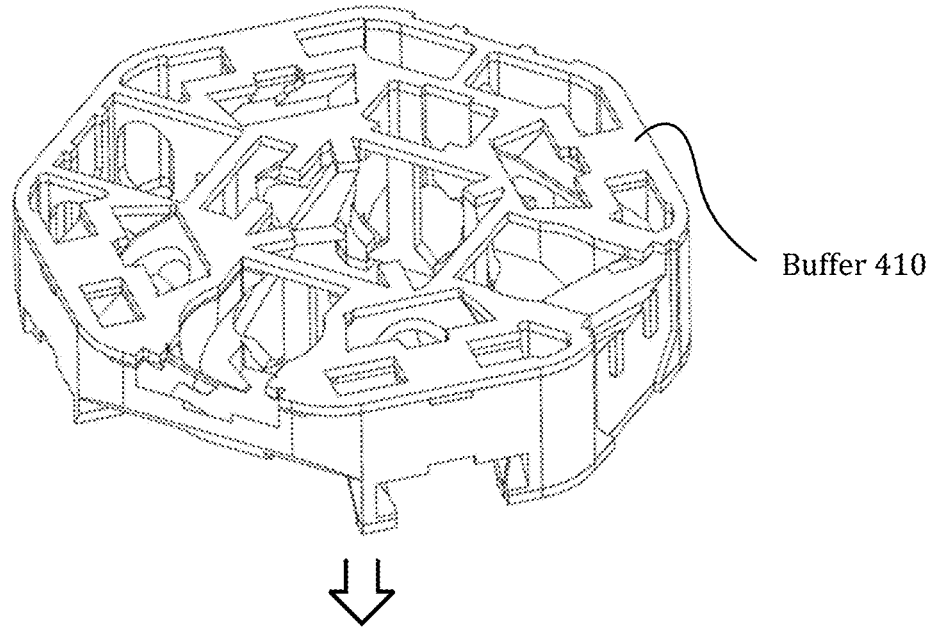
FIG. 9 is a flow diagram of the automated milling process of FIG. 6 for converting the augmented frame to a 3D frame, which is shown in a line drawing from a top perspective.
Figure 9:
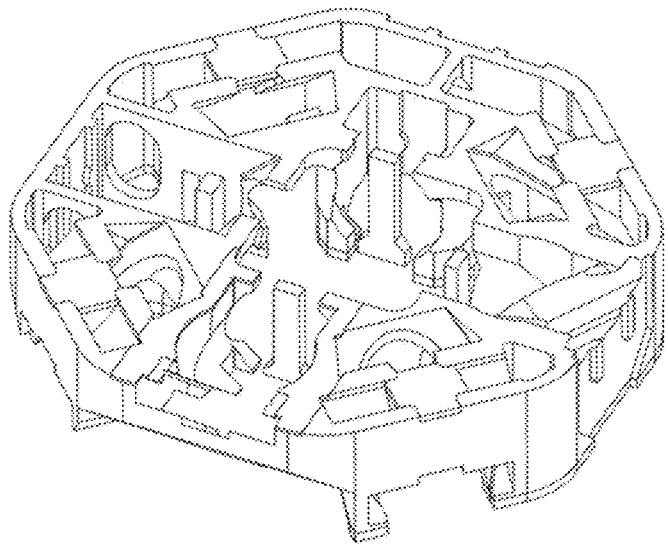
Figure 10A:
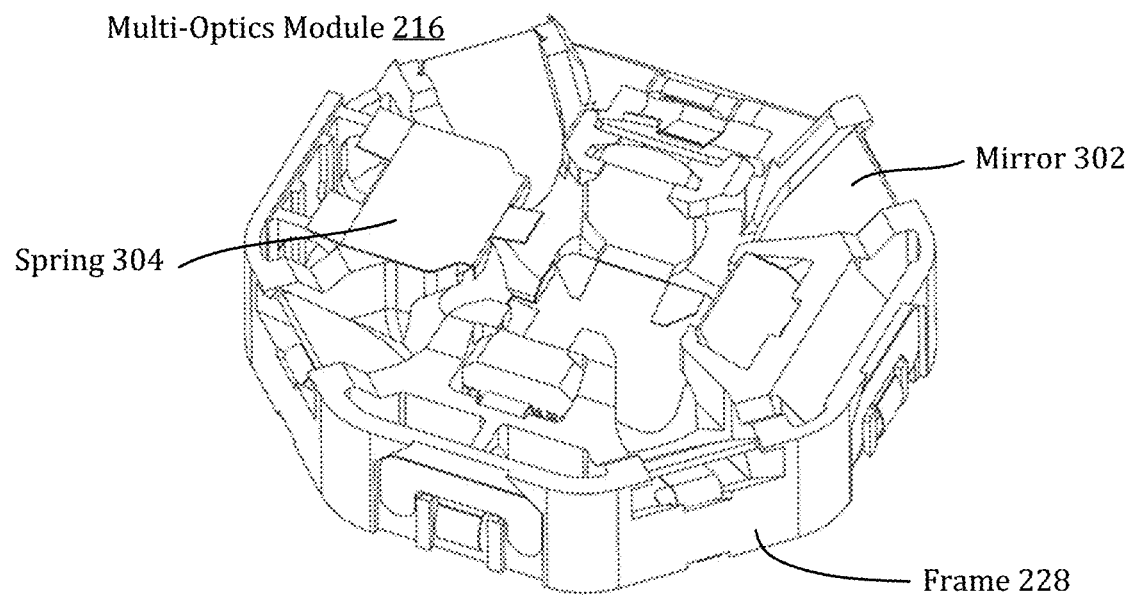
FIG. 10A is a line drawing of the drop-in multi-optics module in FIG. 1 including frame and attachments shown from a top perspective.
Figure 10B:
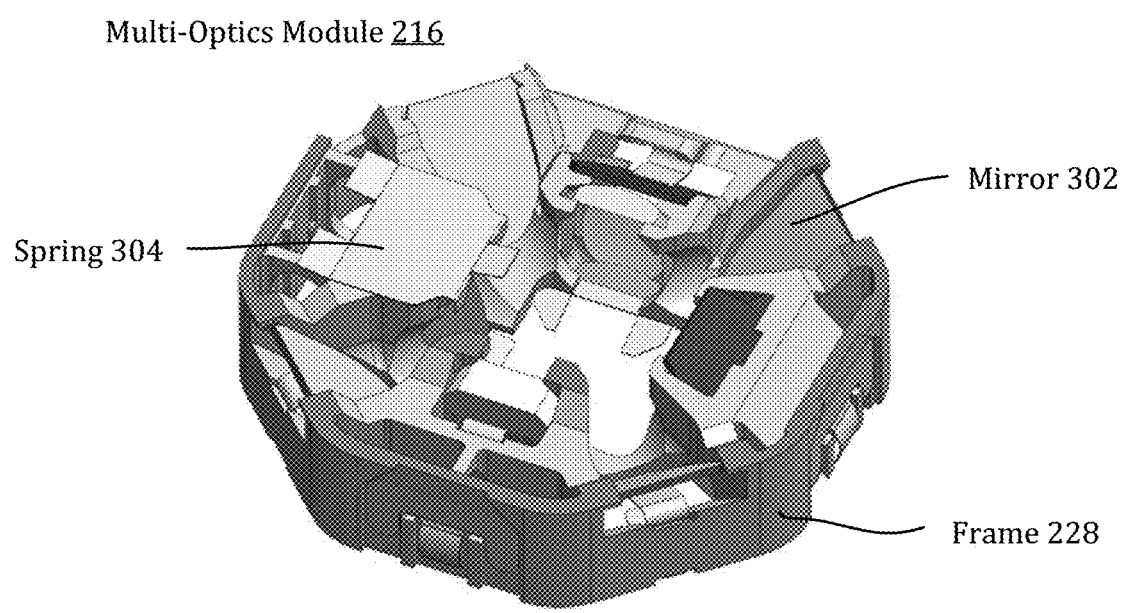
FIG. 10B is a gray-scale version of FIG. 10A.

In practice, media is encoded with code that defines the model 400 of the augmented frame 402. The model 400 can be viewed as a combination of a model 406 of the module frame 228 plus a model 408 of a buffer 410. The code is then communicated to the 3D printer 404, which executes the code to realize augmented frame 402. The excess material of buffer 410 is shown at the top of augmented frame 402 in top perspective view of FIG. 4. Buffer model 408 also provides for material of buffer 410 added at the bottom of augmented model 400, as shown in FIG. 5; likewise, printed augmented frame 402 includes material of buffer 410 on its bottom as shown in the bottom perspective view of FIG. 5. As shown in FIGS. 6, 7, 8 and 9, augmented frame 402 is input to a computerized numerically controlled (CNC) milling machine 600, which precisely removes buffer material 410, resulting in precisely dimensioned frame 228. Frame 228 with mirrors 302 and other components 304 attached is represented in FIGS. 10A and 10B.

A channel cell 1100 is shown in FIG. 11A including a source chamber 1102, a source channel 1104, a science chamber 1106, a getter channel 1108, and an ion pump 1110. A drop in source module 1112 and a drop in optics module 1114 are shown separately in FIGS. 11B and 11C. A drop in getter module 1116 is shown in place in FIG. 11A. Science chamber 1106 includes an atom chip 1118 below optics module 1114, which includes a base aperture 1120 that allows quantum particles to influence and to be influenced by magnetic fields generated by the atom chip 1118. Source module 1112 includes a pin-hole aperture 1121 through which quantum particles exit into science chamber 1106 via source channel 1104. Getter module 1116 includes a graphite getter core 1122 surrounded by non-evaporable getter (NEG) 1124. Graphite getter core 1122 absorbs and regulates the quantum particle partial pressure while NEG 1124 removes contaminants such as oxygen and nitrogen from the vapor. Thus, NEG 1124 relieves ion pump 1110 of that burden so the ion pump can focus on removing helium, which, as a noble gas, is non getterable. Graphite getter core 1122 further acts to more uniformly convert optical power to heat and distribute it to NEG 1124 more uniformly than a direct laser beam is capable of due to the sintered nature and geometry of said NEG.

Figure 12:
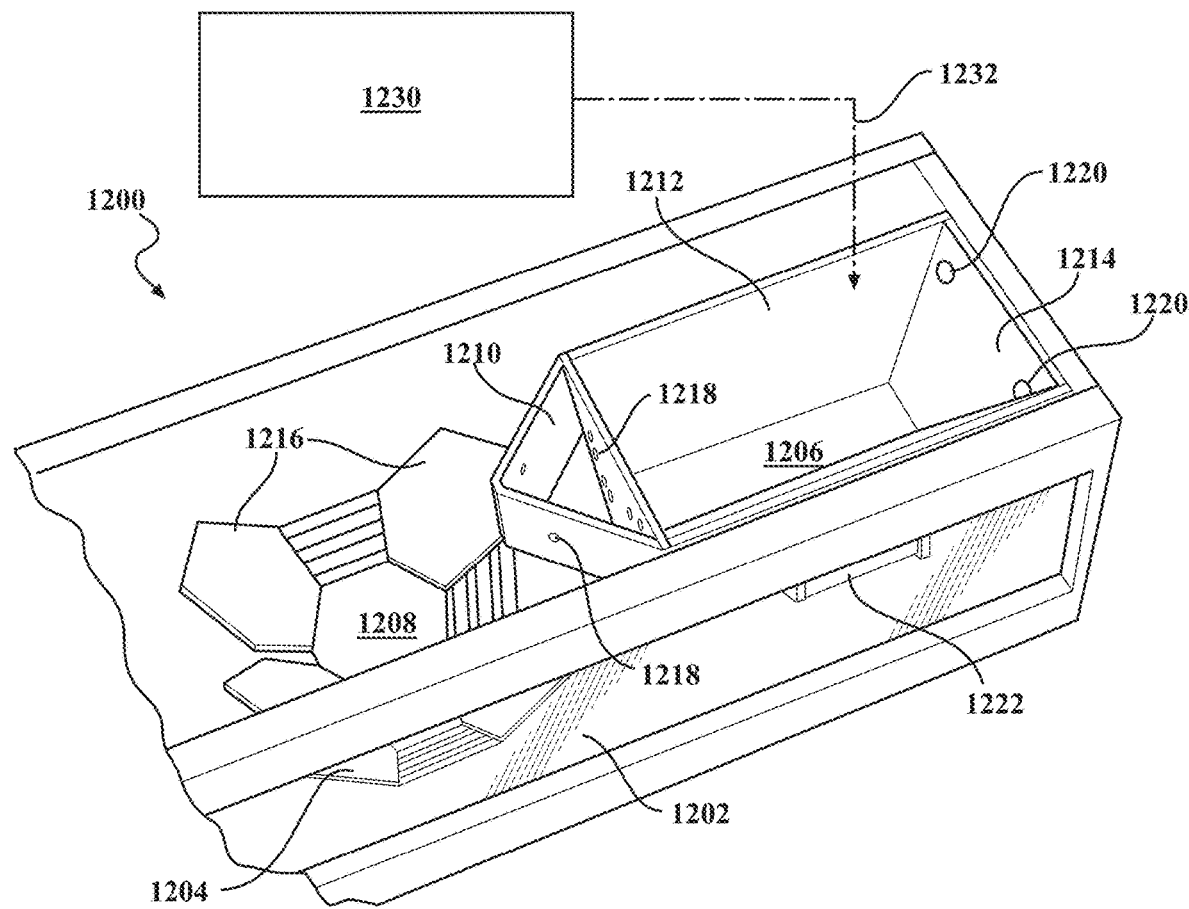
FIG. 12 is a flow diagram of a cut and fold process for making a multi-optics module for a quantum-particle cell.

A quantum-particle cell 1200, shown in FIG. 12, includes transparent glass walls 1202 for laser access and contains a drop-in multi-optics module 1204. Drop-in multi-optics module 1204 defines a two-dimensional magneto-optical trap (2D MOT) region 1208, a three-dimensional magneto-optical trap (3D MOT) region 1208, and a transition region 1210. 2D MOT region 1206 includes 2D MOT mirrors 1212 and a push mirror 1214. 3D MOT region 1208 includes four 3D MOT mirrors 1216. Transition region 1210 defines a pair of pinholes 1218 through which quantum particles flow from 2D MOT region 1206 to 3D MOT region 1208. Quantum-particle sources 1220 are attached to multi-optics module 1204 at 2D MOT region 1206. A non-evaporable getter 1222 is disposed beneath one of the 2D MOT mirrors 1212. Multi-optics module 1204 is formed from a metal sheet 1230.

Figure 13:
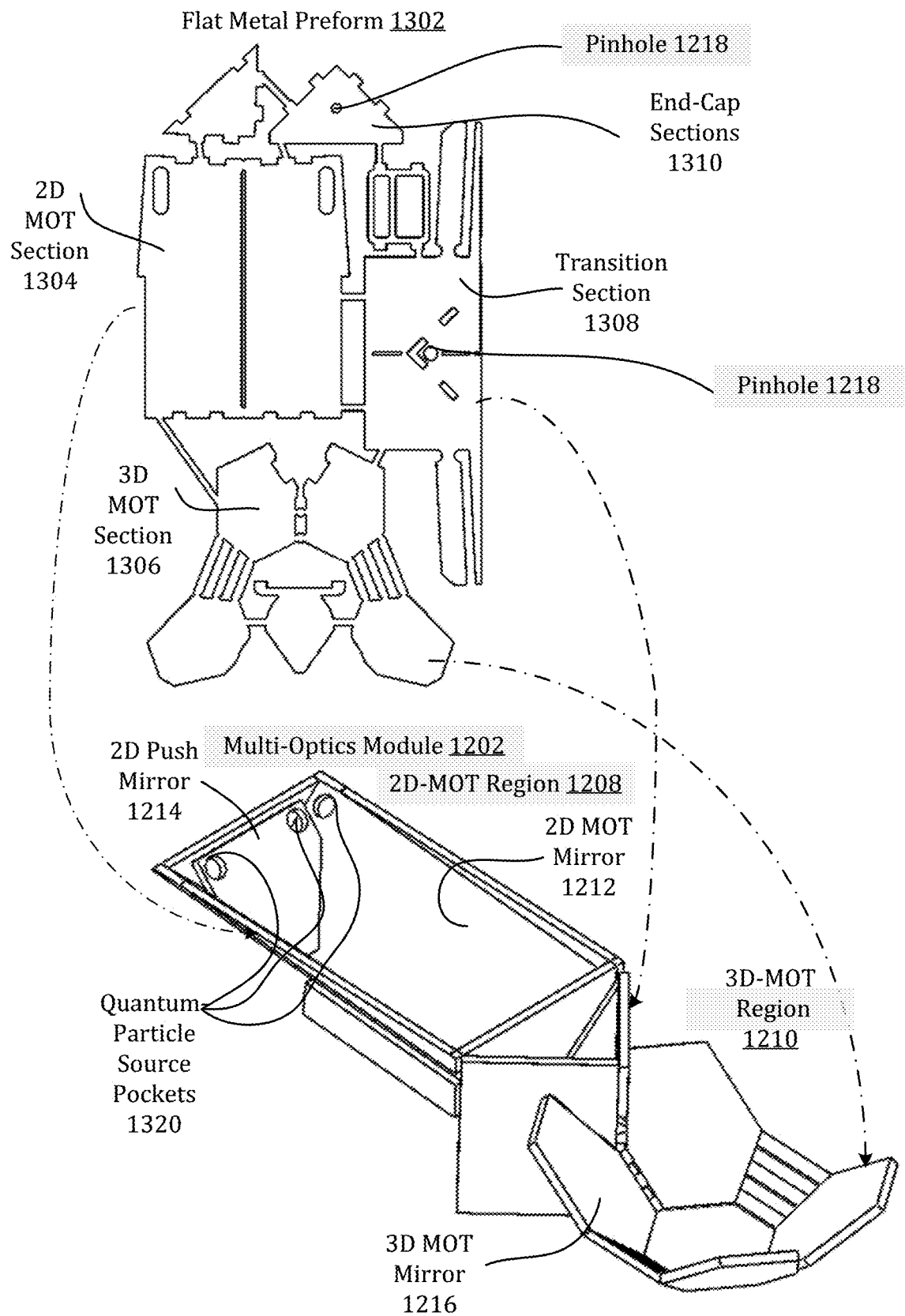
FIG. 13 is a flow diagram for making the drop-in multi-optics module of FIG. 12 from a metal sheet.

Multi-optics module 1204 is formed by cutting a metal sheet 1230 according to a "cut and fold" process 1232. Cut and fold process 1232 can begin, for example, by using a water jet or laser to cut sheet metal 1230 to yield a flat metal preform 1302, shown in FIG. 13. The metal sheet can be single or double side optically polished and High Reflectivity (HR) coated prior to or after cutting. Preform 1302 is then cut to separate a flat 2D MOT section 1304, a flat 3D MOT section 1306, a flat transition section 1308, and flat end cap sections 1310. MOT sections 1304 and 1306 and transition section 1308 are then folded, with annealing being used during and following folding to reduce folding-induced stress. Polished surfaces can serve as mirrors for 2D and 3D MOT regions 1208 and 1210. The sections are then attached, e.g., by welding tabs into slots to yield drop-in multi-optics module 1202. Quantum-particle source pockets 1320 serve as locations for quantum-particle sources 1220 (FIG. 2).

Surfaces may further be machined, stamped, patterned, or etched to form gratings, shaped mirrors (e.g., concave mirrors), made optically absorptive such as through chemical nano or RAR (random Anti Reflective) type surface patterning, or have coatings grown, plated, or patterned onto them. Further mounting features may be patterned, soldered, welded, attached, plated, or otherwise formed to allow for further mounting and attachment such as of MEMS devices, sensors, transducers, active or passive elements, etc. Acoustic resonance structures may be selectively engineered or detuned with local annealing, softening, or hardening or welded onto, plated, grown, or structured to reduce resonant ringing from impulses to improve shock/vibe performance and optical stability such as for high-precision interferometry and sensing.

Figure 14:
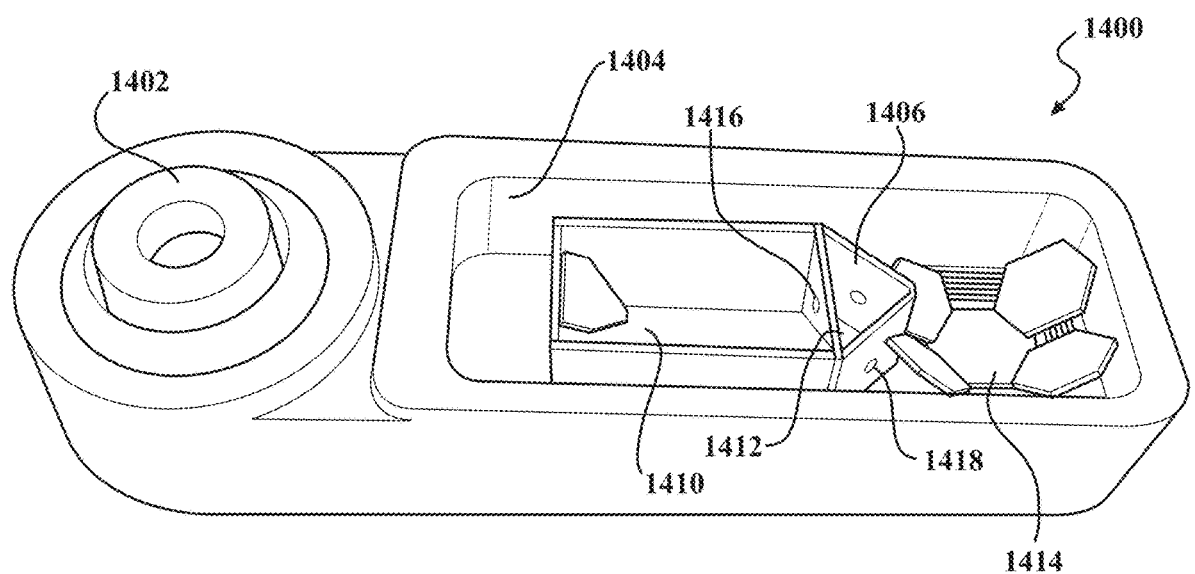
FIG. 14 is a perspective view of another quantum-particle cell including a drop-in module like the drop-in module of FIGS. 12 and 13.

A quantum particle cell 1400 includes an ion pump 1402 and a science chamber 1404 populated by a drop-in multi-optics module 1406, which is like module 1202 of FIG. 12. This demonstrates that one type of drop-in module can be used in distinct types of quantum-particle cells. Quantum-particle cell 1400 includes a body 1410 that defines an ion-pump chamber into which ion-pump 1402 is inserted as shown in FIG. 14 and science chamber 1404. Prior to insertion of multi-optics module 1406, science chamber 1404 is configured to support a vapor pressure that is distributed uniformly throughout science chamber 1404.

Once inserted, multi-optics module 1406 divides science chamber 1404 to define a 2D MOT region 1410, a transition region 1412, and a 3D MOT region 1414. Once the quantum-particle cell is completed, the science chamber is configured to maintain a vacuum chamber with a vacuum pressure below $10-3$ Torr ("high vacuum", aka "HV") and, depending on the embodiment, below $10^{-6}$ Torr ("very high vacuum", or "VHV), $10^{-9}$ Torr ("ultra-high vacuum", aka "UHV") or even below $10^{-12}$ Torr ("extremely high vacuum", aka XHV). 2D MOT region 1410 is fluidically coupled to transition region 1412 by an entrance pinhole 1416, while transition region 1412 is fluidically coupled to 3D MOT region 1414 by an exit pinhole 1418. Thus, 2D MOT region 1410 and 3D MOT region 1414 are fluidically coupled to each other via pinholes 1416 and 1418, which thus serve to support a pressure differential between 2D MOT region 1410 and 3D MOT region 1414. Thus, 2D MOT region 1410 and 3D MOT region 1414 can be characterized as sub-chambers of science chamber 1404. Similarly, multi-optics module 1204 divides the interior of quantum-particle cell 1200 to define a 2D MOT region 1206 and a 3D MOT region 1208 that are fluidically coupled to support a pressure differential between them.

Figure 15A:
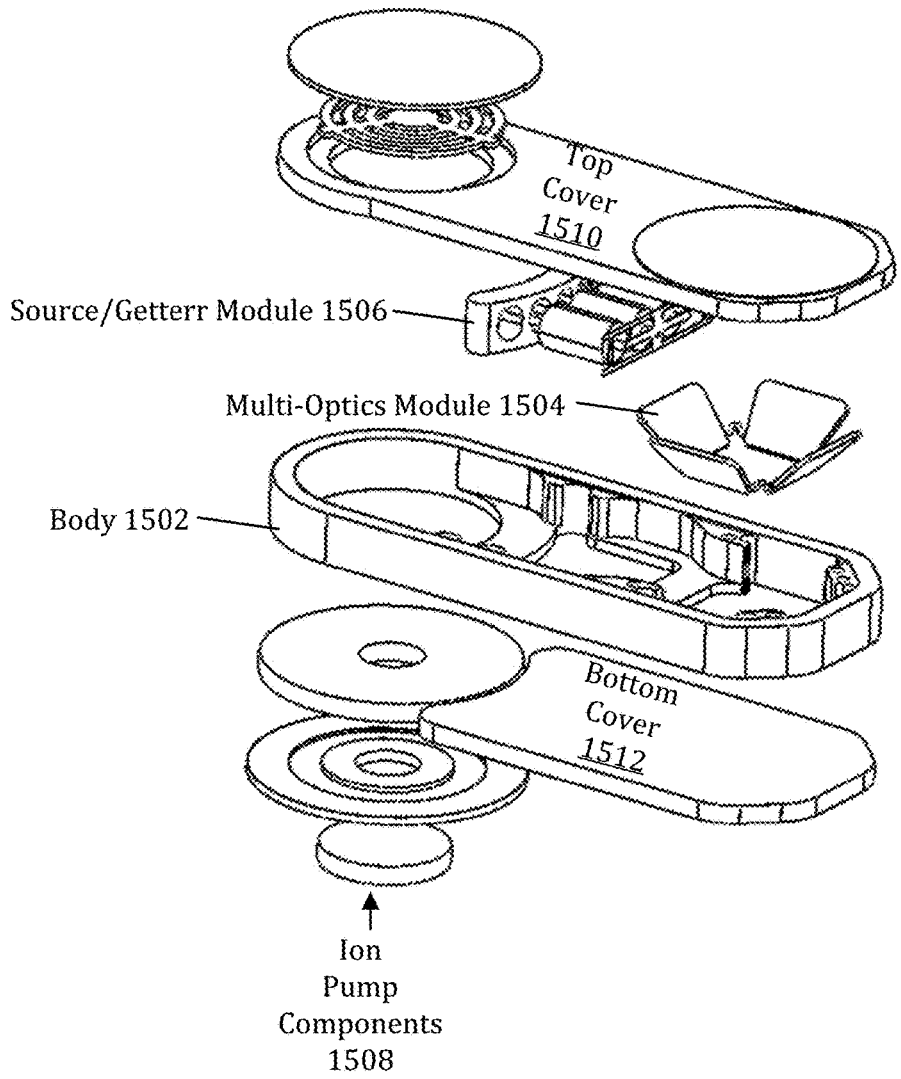
FIG. 15A is an exploded diagram of a quantum-particle cell including a folded 3D multi-optics module.
Figure 15B:
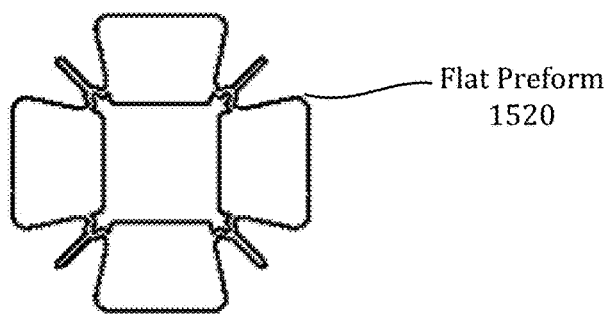
FIG. 15B is a diagram of a cut metal sheet prior to being folded to yield the multi-optics module of FIG. 15A.

A quantum particle cell 1500, shown in FIG. 15A, includes a body 1502, a multi-optics module 1504, a source and getter module 1506, ion-pump components 1508, and top and bottom covers 1510 and 1512. FIG. 15B shows a flat preform 1520 that was cut from sheet metal and later folded to form optics module 1504.

Figure 16:
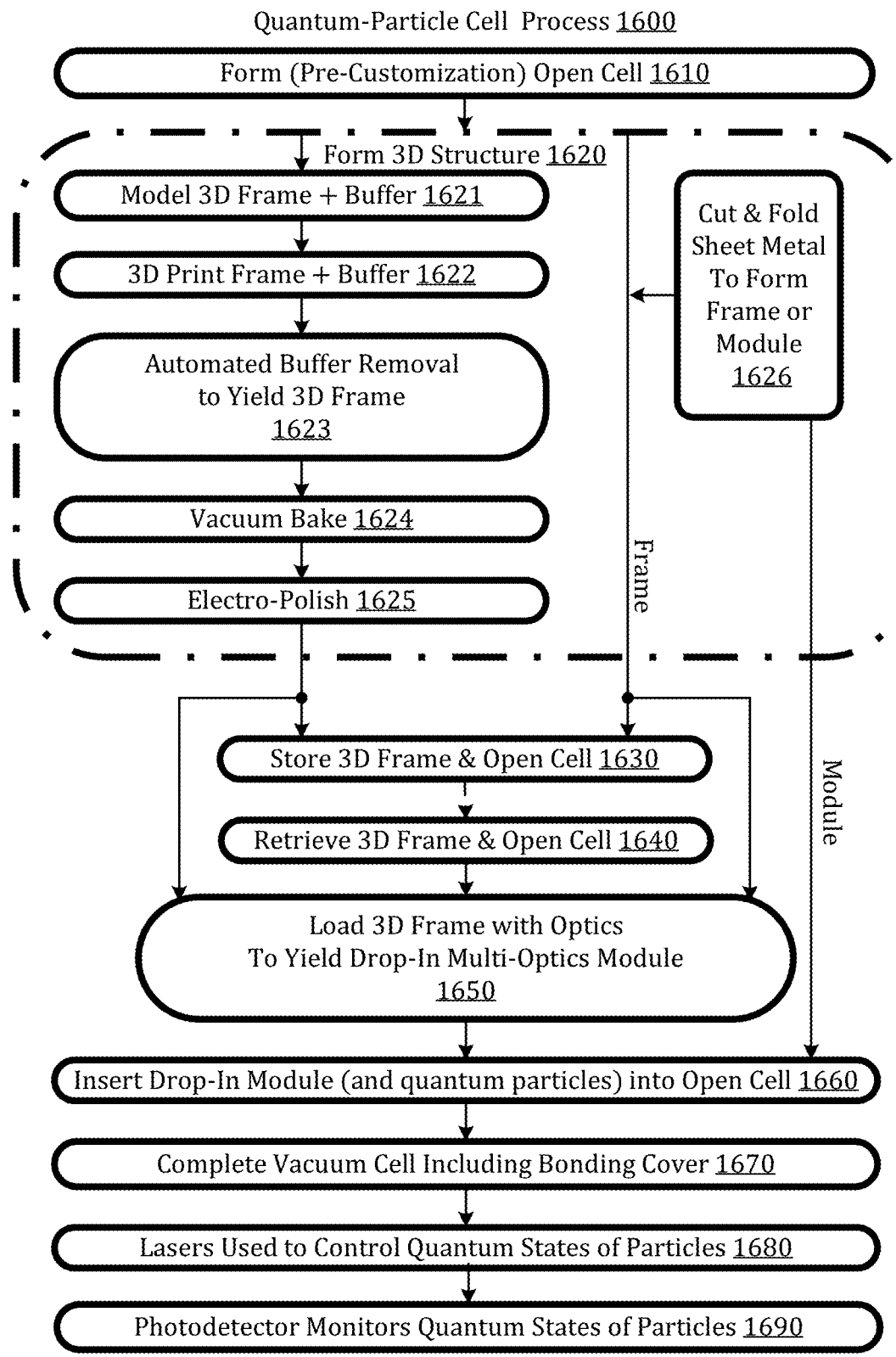
FIG. 16 is a flow chart of a process for manufacturing a quantum particle cell in which a multi-optics module is dropped into an open cell.

A quantum-particle cell manufacturing process 1600 is flow-charted in FIG. 16. At 1610, an open cell is formed, typically by bonding a base or bottom cover to a cell body or one or more sidewalls. At 1620, a 3D module structure, which can be a frame or a complete module, is formed. A variety of frames or structures can be formed and stored having differing purposes defined by varying enclosed geometries, varying components, and optics, but having the same external locating profiles to mate with the complimentary cell cavity. In the case of a frame, it can be stored at 1630 (as the open cell can be) and kept in inventory until it is retrieved at 1640 when a bespoke order is received, or it is otherwise time to complete the cell. Alternatively, a frame can be used without storing and retrieving. At 1650, the frame is loaded with optics and, in some cases, other elements, e.g., standoffs, quantum-particle dispensers, and/or getters, to yield a drop-in multi-optics module. At 1660 the module can be inserted into the open cell. Quantum particles can be introduced to the open cell, either as part of the module or separately. At 1670, the quantum-particle cell is completed, the completion including bonding a cover to the open cell.

In 3D printed embodiments, the 3D structure can be formed by creating an augmented model (of an augmented frame) at 1621. The augmented model is a model of the desired frame plus a model of a buffer, that is, material added to ensure the 3D printed object meets or exceeds the dimensions desired for the 3D frame. In some embodiment, the augmented model can also provide for warpage support structures.

At 1620, the augmented model is 3D printed yielding an augmented frame including a buffer and, in some cases, warpage support structures. At 1623, automated machining, e.g., by a CNC milling machine, removes the buffer and then any warpage support structures. that is augmented by, printing the model to yield an augmented frame at 1622, machining the augmented frame to remove buffer material to yield a frame with the desired dimensions. In some embodiments, a vacuum bake or firing is performed at 1624 to remove potential contaminants that may be embedded in cell walls and in the drop-in module. At 1625, electro-polishing can be performed to reduce tolerances and provide for reflective surfaces. Baking and electropolishing may occur for large batches of similar or dissimilar parts and then stored in a clean manner such as under rough vacuum or in a desiccator.

In a cut and folding embodiment, a frame can be formed by cutting and folding sheet metal. For example, at 1626, the 2D MOT portion of the drop-in module of FIG. 12 can be considered a frame and the transition region and 3D MOT regions can be considered attachments. Alternatively, sheet metal without attachments can be treated as a completed module, which is another way of looking at the module of FIG. 12 and the main way of looking at the module of FIG. 15A. In this last case, process 1600 proceeds directly from formation at 1620 to insertion at 1660.

It should be noted that the product resulting from process 1600 differs from products made using processes not involving 3D printing, cutting, and folding. The presence of a folded structure can be detected from the presence of folds, while 3D printed frames can be identified by the support beams and texture in the end product.

At 1680, lasers are used to control (e.g., cool, move, trap, change the quantum states of) quantum particles. At 1690, photodetectors detect light exciting the cell, e.g., to track probe beam absorption and/or fluorescence.

The present invention provides for proper tolerancing and printing of titanium 3D printed frames for in-vacuum optics fixturing. The Cold Atom Source System (CASS) is an integrated cold atom module that uses miniaturized and embedded hardware instruments. The key subsystems include a vacuum cell, laser system, opto-mechanics, magnetics, and control electronics. The device can, for example, serve as a cold atom source platform for the deployment of future quantum Position, Navigation, and Timing (QPNT), quantum computing, and quantum memory systems. The performance of CASS can be benchmarked against critical performance metrics including atomic flux, total atom number, sample temperature, and trap lifetime. These metrics along with the aggressive Size, Weight, and Power (SWaP) specifications are advantages of CASS.

Quantum technology based off ultracold atom sensors and computers can outperform current state-of-the-art technologies. To realize this quantum "advantage", major improvements must be made to the core cold atom hardware such that these systems are easily deployable. CASS accomplishes this by increasing the manufacturing readiness level (MRL) and technology readiness level (TRL).

The key problem characteristic for a deployable quantum system is that it must be compact, power efficient, and ruggedized for harsh environments. The deployable quantum system can leverage "channel cell" technology, which is a compact, monolithic vacuum cell. This work has been patented under U.S. Pat. No. 8,415,612B2 and serves as the basis for some of the vacuum cell technology used within CASS. In addition, the CASS can leverage "turn-key" scientific instrumentation for researchers in ultracold atom physics. The hardware includes lasers, optics packages, and electronics.

3D printed metals provide an excellent way of making complex geometries but are susceptible to large tolerances that make integration difficult especially with smaller formfactors. 3D printing is characteristically different compared to standard machining practices in that material is added as opposed to removed. This creates limitations on the manufacturing precision. Prior approaches have employed postmachining that involves laborious hands-on work. Because the prior approach used, for instance hand-filing or shimming, the finished product was not well toleranced and took far too much time to process. This is counter-productive to increasing the manufacturing readiness level (MRL).

To avoid excessive post-machining work, "buffer" zones with extra material can be added to provide better structural support during the print process and to enable mill work as opposed to filing. What was required was design work in the CAD model to add the buffer material on the top and bottom surfaces and to create bridge structures between gap areas. Post machining mill work then removes the buffer material with great precision down to the desired tolerance. The 3D printed frames serve as mirror mounts for the intra-vacuum optics and must be well referenced with respect to the vacuum cell interiors. Alternative approaches could involve machining, etching, or fabricating mirror structures out of the silicon manifold itself which by-passes the need for 3D-printed materials.

Buffer material is used for structural support and postprocessing precision. The approach avoids excessive handson work and also provides a better toleranced component. The new 3D printing process allows buying in bulk and keeping an inventory or rapidly repurposing existing cell bodies to enable system function not yet enabled by inventoried drop-in components to address evolving demand.

In the fabrication of UHV vacuum cells for deployable systems, many challenges must be addressed from hermiticity, robustness, size, optical access, power consumption, etc. However, often solutions are coupled with problems wherein for size, weight, or robustness, the internals are integrated in the fabrication process of the vacuum chamber itself. When one makes modular components that drop in, these can often have significant tradeoffs in their design to enable mounting, or they consume significant space. Integrated solutions also present their own challenges such as building mirrors or mounting features into walls of the vacuum chamber makes what is already an expensive part more expensive and risks yield. The disclosed process of using 3D drop-in modules represents a fusion of technologies that solve many of these challenges in about the smallest reasonable footprint, mass, and complexity possible while sacrificing little in performance, robustness, or cost.

The most important choice is often (ultra-high-vacuum) UHV compatibility. Stainless steel is a typical go-to material for UHV compatibility, and yet it has magnetic properties that can be less than desirable, especially for compact systems where the physics of the vacuum chamber may occur too close to a steel component or wall. For this reason, glass, crystalline materials, or ceramics such as glass and silicon can be selected. However, these compound the problem of designing screw, mounting, or integrated features. While one can shape and polish internal surfaces for mirrors, lenses, etc., these processes are expensive and add risk to the fabrication of the part.

Glass is often desirable as a chamber material as it can also allow high quality optical access into the vacuum to allow for precise manipulation or interrogation of species in the vacuum chamber. Glass can also be insulative electrically and thermally to great advantage. Silicon likewise may be chosen for its structural properties and its relative and adjustable conductive properties. Further, thanks to the integrated circuit (IC) and display industry, there is significant technology in the forming, assembly, and large-scale fabrication using these materials. While bonding internal mirrors, optics, MEMS, or other internals is straightforward, it can be expensive due to the processes involved, and the risk to the core part when a bond attempt results in a flaw that may lead to a fracture or hermetic failure among other issues.

Decoupling the choice of vacuum chamber material from the internals can provide design flexibility. While stainless is less than ideal, in some circumstances it is fine. In others, titanium can be more desirable. While titanium is a well understood material, forming, and shaping through subtractive processes such as CNC machining can be expensive especially for centimeter scale and smaller features. However, the advent of 3D printed steel, titanium, other metals, ceramics, and crystalline materials provides a lot of options.

An alternative, or complimentary technological approach can be, instead, to use readily available sheets of materials, especially metals, such as titanium. Titanium can be polished to high quality though the reflectivity of the native surface can be less than desirable depending on the optical purpose of the surface. Conveniently titanium is often used as an adhesion layer, or a thin film layer put down due to its higher-than-average tendency to bond to the substrate material and the subsequent deposited thin film coatings. Therefore, polished titanium, especially shortly after polishing, a light buffing step, a reducing plasma step, or following a chemical etching step to strip the native oxide, is a very desirable substrate upon which metallic or dielectric coatings or thin films can be applied.

Protected metallic or dielectric high-reflectivity (HR) coatings allow polished metals like titanium to become quality mirror surfaces. Machining, stamping, masked etching or growth, precise 3D printing, or laser engraving, laser ablation or other patterning process can also turn such a surface into a quality diffraction grating for beam-shaping/ splitting. The same ability to plate other metals makes bonding such as TLP, indium, eutectic, brazing, or even solder bonding to be viable for UHV assemblies. As a substrate material, polished titanium has many useful properties and therefore possibilities whether it be in the form of computerized numerically controlled (CNCed), polished cut folded and welded sheets, or 3D printed titanium components and structuring.

Once polished, and before or after the coating process, the sheet can be cut such as with a laser (CW or pulsed), patterned and etched, traditionally machined, or even micro waterjet cut to shape or add features. Such a product can then be shaped such as with a press or jig to precisely align the features and integral components such as to form a multi mirror beam-shaping platform for a 2D or 3D magneto-optical trap (MOT). Jigging can be metallic with coatings or thin films/materials or standoff/release coatings or powders to protect the mirrored surfaces of the titanium structure. Jigging, such as a carbon press jig, can be used to force the components such as a set of four mirrors into precise alignment and then heat is applied to anneal the joints locally. In this case, thin connecting features of thin titanium are advantageous as they are robust, conduct heat poorly and thus application of heat via a micro torch, local resistive heating, laser, friction, etc., can anneal the part into precisely aligned shapes without thermally risking the potentially delicate HR coatings or other features. Further, the jig can protect the optics fundamentally so, for example a material such as graphite can help to pull heat away from the mirrors helping to further localize heating efforts to the connecting features. Locally controlling the emissivity with polishing, blackening, plating, etc., can allow for more controlled thermal management through blackbody radiation, high conformity thermal contact for heat transfer, or controlling emissivity for laser radiation absorption.

Features can be cut into the structure to enable easy interleaving, joining, or mounting to further structures, sub-components, or into the walls or features of the vacuum chamber itself. In this way, rather than bending a single sheet or structure, multiple components such as 3D printed parts and laser cut, or computerized numerical control (CNC) machined parts can be joined into an interlocking or locating assembly. Springs, standoffs, tethers, alignment pins, suspension wires, various mounts, and many other components can be attached in a manner facilitating rapid assembly and alignment, while maintaining significant robustness to shock and vibe by keeping mass and complexity to a minimum. Joints can be affixed via wire ties such as with tantalum, steel, etc., as well as brazing, soldering, spot welding, laser welding, direct metal laser sintering, etc.

Structures, whether folded sheet metal, 3D printed fixtures, machined fixtures, or mounting features etc., can then be used to capture more precise, expensive, or otherwise specialized components that cannot be formed directly from or onto the bulk material. These can include atom chips, aspheric lenses, diffractive, polarizing optics, refractive optics, steering optics, IC's, etc., as well as integrated combinations thereof. Such components can be inserted/ installed/affixed before during or after the fabrication and assembly process with such as in the middle of a 3D printing run, or between steps of folding cutting forming or assembling structures to allow for more integrated capture.

Protective coatings can be employed that can be dissolved, washed, flashed, burned away or otherwise removed to protect delicate components such as integrated circuits or optics from the abusive fabrication processes such as continued DMLS 3D printing. DMLS is a 3D printing process that uses a computer-controlled, high-power laser beam to melt and fuse layers of metallic powder together. Interfacing platings can be applied to components such as metalized platings or eutectic precursors or soldering pads such as solder bumps to components to further enable direct integration with fabrication processes such as 3D printing, wire bonding, laser fusing, etc., to directly mate the dissimilar materials and components.

Ideally, all fabrication, forming, cutting, bonding, etc., processes occur under ultra-clean conditions with pure and clean parts. However, the reality of many processes and the need to outsource some processes can necessitate interim or post fabrication/assembly cleaning for UHV. This cleaning can include wet baths such as wet cleaning processes like piranha, nanostrip, RCA, BOE, electropolishing or more pure caustic stripping processes such as hydrofluoric acid (HF) and reactive plasma. More simplistic abrading such as bead blasting, sanding, post machining, intense radiation exposure (e.g., thermal, optical, ionizing) can be employed. Where possible, such processes are typically more beneficial under high vacuum, very-high vacuum (VHV) or ultra-high vacuum (UHV). Platings, barrier coatings, passivation layers, etc., can be grown or applied by liquid bath, reactive gas flow, furnace, or other application processes to capture and passivate the surfaces to improve vacuum performance. Such methods all have tradeoffs and can be applied depending on constituent parts in the assembly at the assembly/ fabricate state to which they are applied so great care needs to be exercised in the choice of UHV compatibility preparations taken.

Active and passive electronic components can be affixed, bonded to or otherwise be a part of drop-in assemblies. Insulative coatings such as dielectrics or native or enhanced oxides, nitrides etc., can be applied, grown, laminated, bonded, or attached to surfaces to allow for subsequent affixing of conductive circuitry for IC's, MEMS, lasers, electro-optics, etc., thereby enabling closely mounted or passive and active assemblies to more directly interact with atomic species inside vacuum or reduce the total volume and package size. These can also be applied to inside walls of the chamber by the same means such as attached or even plated or patterned directly to the surface. Patterning can be by masked platings, rastered laser etching, ablation, or writing of conductive or insulative paths into conductive, semiconductive, or insulative materials such as metals, silicon (doped or otherwise), ITO, etc., wherein the patterning establishes traces of higher or lower conductivity paths to guide current flow. In this way 3D circuitry can be applied about structures that are dropped in effectively "folding" the circuit board about the surface topography or even imbedded into or through such structures.

3D embedded circuitry can be printed or written into materials directly at the time of fabrication such as with high and low conductivity materials controlled by the native material applied such as conductive metal (titanium, copper, steel, etc.) beads or filament or chemical precursors used for additive machine structures that are conductive within a bulk. The structures are then insulated for controlled conduction paths by likewise writing, forming, plating, growing insulative structures about the conductive structures in layered additive formations, bath, or flow formations such as CVD of insulators about printed 3D conductive traces, or changing the background or "shielding" gas used during the 3D printing, additive formation, growth, etc. In such an embodiment, wire or conductive paths can be extruded or formed structurally and in 3D space using a gas or UHV compatible or cleanable flux to make quality conductive paths. Then, after the wire has been deposited as an $N^{th}$ layer, for a subset of the total layers or formation length, or formed in its entirety in 3D space, the shielding gas changes to an oxidizing gas or one that facilitates formation of insulative barrier coating about the conductor as a precursor to then applying additional structural insulation material, or highly structural materials such as titanium or metals, or yet further high density 3D traces and wirings. Such 3D formed circuit pathways can be dropped in or integrated into vacuum structures, walls, or internals for further cell formation.

Advantages of such minimal mass and volume drop-in components by whatever method of fabrication is the ability to maximize use of enclosed volume within the vacuum chamber. Components such as steering mirrors, lenses, MEMS, etc., often end up using more space than necessary. Utilizing minimal mass and thickness components allows for folding utilized volume such as by placing alkali dispensers, getters, heaters, or more mirrors and optical or electrical components in proximity and within the dead spaces of components such as directly behind thin mirrors forming MOT regions dramatically reducing consumed volume within cells.

Use of high-quality optics that are inexpensive (simple-shaped mirrors with dielectric coatings or native material, first surface metal, or other reflective refractive, diffractive, polarizing, waveplate or otherwise optically active or manipulating or adaptive coatings or structures) on thin (low mass/volume) substrates as well as capturing lenses, gratings, MEMs structures and other optical, magnetic, electric, mechanical. components precisely. Preferably, sapphire or titanium or other robust materials are used for damage resistance or spot weldability or using small force spreaders, dampeners, capture fixtures made of softer, weldable, or capturable metals like tantalum, steel, etc., that can be welded on, captured, etc.

3D printing metals can allow structures that are volumetrically very efficient and inexpensive to produce and yet are weldable for fixturing, springs, suspension wires, getter attachments. Tapering 3D printed structure for ease of insertion, and use of springs and sacrificial/attachable stops for location. Geometry of springs to allow for insertion and removal. Alternatively polished, cut, and folded metal sheets such as titanium may be ion beam sputtered (IBS) coated, dielectric coated, metal plated, etc., to form structured reflectors or scaffolds for mounting other types of optics. These have similar advantages to 3D printed frames in that they are very low mass and can form complex optical geometries. Forming can be done with presses, cold or hot, using various local (such as with targeted laser annealing), preferably, or global annealing methods. Localized softening/annealing/tempering/hardening can be used to adjust harmonics to desired frequencies or to neutralize harmonic resonance.

A method of processing 3D printed structure or polished titanium/metal structure includes electropolishing then vacuum firing. Dead volume in 3D printed structures can be populated with dispensers, getters, inductive pickups, light absorbers, IC's, and other active and passive components that are UHV compatible. This allows the frame/assembly to be an a-la-carte adaptable module that is selectively configured for the application, species, etc. In this way, a vacuum chamber that is generic can accommodate a variety of applications and configurations chosen by the customer or the mission prior to cell assembly.

Split rings can reduce eddy currents and be fundamentally spring loaded to capture, for example, an insulative gap filler like glass or sapphire to meet precise geometric tolerances. Gaps can be filled with insulative materials like ceramics, glasses, oxidized or coated metals or other materials that are UHV compatible and can also be UHV passivated/coated deadening materials such as lead, tantalum, or other softer materials to adjust harmonics of the structure or absorb vibrational/acoustic energy. Oxide, nitride, or other coatings/platings can improve outgassing. There is a choice of metals for a-magnetism, printability, polishability, etc.

A drop-in module can also hold atom chips, ion traps, etc., or be mounted above or near them to aid in functionality. The module can be coated with getter materials to have lots and lots of surface area for absorbing, adsorbing, or desorbing gases. The module can be chemically/laser etched to increase surface area rather than electropolished to decrease it. The module can itself have spring components printed into it or most features that are to be fused on or tied on like tantalum suspension/insulators or Inconel springs can also just be finely printed as part of the innate structure. They can be printed with multiple materials such as steel and tantalum and titanium for example, so it is all done by printing. They can also have metals such as copper printed onto the back side or deposited, plated, and etched, etc., over insulative coatings such as oxides, nitrides, or other dielectrics in order to form on-surface or back of surface coils. They can be used to also mount internal coil structures for magnetics, or to mount UHV compatible permanent magnets.

Drop-in modules can mount fibers, coupling or collimating or shaping steering optics, and can also be finely printed or post machined or used to mount resonators. They can be welded to internals of titanium or other metal UHV chambers such as some ion traps. They can also partially or fully comprise components of active pumps such as titanium-sublimation pumps (tisubs), titanium-sputter ion pumps, or even parts of turbo or mechanical pumps or as parts of actuators such as for shutters or positioning devices.

De-rebondables or just conflats (a type of metal flange for rapid vacuum assembly) can allow for rapid reconfiguration of UHV internals and recycling/repurposing of UHV housings to adapt to various purposes or applications. A drop-in module can, by itself, comprise the sub chambers of 2D, 3D, science and other chambers by making a rough quasi isolated or quasi sealed, or even a full sealed surface (such as with indium, eutectics, etc.) to an optical window allowing for single window access in a simple system (thumb MOT) yet allowing for configurations of complex systems such as 2D-3D-science or quantum computing all in the same housing with minimal modification or complexity of the actual vacuum housing. which is also advantageous as it only requires one high quality window with all the coatings desired.

Herein, a "quantum-particle cell" contains quantum particles that are isolated from an ambient by walls of the cell. Herein, a "quantum particle" is a neutral or charged atom or molecule in a context in which its quantum state can be controlled or monitored. Herein, a "vacuum cell" is a structure defining a boundary between an interior and an ambient, wherein the pressure in the interior is at most $10^{-3}$ Torr and is less than the pressure of the ambient. Herein, an "open cell" is a structure with a defined 3D interior, but that does not isolate that interior from a cell exterior, e.g., due to the absence of a cover. Herein, open cells are formed by bonding a base to a sidewall structure; the sidewall structure can have, for example, four sidewalls defining a square or rectangular cross section, six walls defining a hexagonal cross section, or a single sidewall with a perimeter in the form of a closed loop. In the cases of interest herein, converting an open cell to a vacuum cell involves bonding a cover to the open cell.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description to provide a thorough understanding of the invention. These details are provided for the purpose of example and the invention may be practiced according to the claims without some or all these specific details. To clarity, technical material that is known in the technical fields related to the invention has not been described in detail so that the invention is not unnecessarily obscured.

Herein, all art labeled "prior art," if any, is admitted prior art; all art not labeled "prior art", if any, is not admitted prior art. The disclosed embodiments, variations thereupon and modifications thereto are provided for by the present invention, the scope of which is defined by the accompanying claims.

What is claimed is:

1. A quantum-particle cell process comprising:
    forming an open cell, the open cell defining an interior and including at least one sidewall;
    forming a multi-optics module with plural optical elements aligned with respect to each other with at least one of the optical elements attached to a portion of the multi-optics module during alignment of two or more of the optical elements;
    inserting the multi-optics module into the open cell after forming the multi-optics module;
    introducing into the open cell:
        quantum particles, or
        a quantum-particle source that can release quantum particles, wherein the quantum-particle source is a component of the multi-optics module or is introduced separately from multi-optics module; and
    converting the open cell to a quantum-particle cell that isolates its interior from an ambient that contacts the sidewall, the converting including bonding a cover to the sidewall; and
    controlling or monitoring at least one quantum state associated with at least one quantum particle in the quantum-particle cell using one or more components that include at least one component within or optically coupled to the quantum-particle cell.

2. The quantum-particle cell process of claim 1 wherein the forming the multi-optics module includes cutting and folding sheet metal.

3. The quantum-particle cell process of claim 1 wherein the forming the multi-optics module includes:
    forming a three-dimensional (3D) frame; and
    attaching components to the 3D frame to yield the multi-optics module.

4. The quantum-particle cell process of claim 3 wherein the forming a 3D frame includes cutting and folding a sheet metal.

5. The quantum-particle cell process of claim 4 wherein the cutting takes place while the sheet metal is flat to yield a 2D preform and wherein the folding includes folding the 2D preform to yield the 3D frame.

6. The quantum-particle cell process of claim 3 wherein the forming the 3D frame includes 3D printing.

7. The quantum-particle cell process of claim 3 wherein the forming the 3D frame includes:
    inputting an augmented model of an augmented frame, the augmented frame including the 3D frame augmented by a buffer;
    3D printing the augmented model to yield the augmented frame; and
    removing the buffer to yield the 3D frame.

8. The quantum-particle cell process of claim 7 wherein the removing includes use of a computerized numerically controlled (CNC) milling machine.

9. The quantum-particle cell process of claim 7 wherein the removing is performed by a 3D printer.

10. The quantum-particle cell process of claim 3 wherein the components include optical elements, dispensers of the quantum particles, getters, or standoff features.

11. The quantum-particle cell process of claim 1 further comprising using one or more lasers to control quantum states associated with one or more of the quantum particles.

12. The quantum-particle cell process of claim 11 further comprising using at least one photodetector to monitor light exiting the quantum-particle cell corresponding to at least one quantum state associated with at least one of the quantum particles.

13. The quantum-particle cell process of claim 1 further comprising using said multi-optics module by mounting it into conformal contact to at least one internal wall or surface of the quantum-particle cell to create an inner contained cavity within an outer cavity wherein said inner contained cavity is effectively isolated from the outer cavity except by low conductivity paths or pinhole and operates at a higher vapor pressure than the outer cavity enabling a two or multi-chamber differential pressure double or multi-MOT system within what would otherwise have been a single chamber particle cell.

14. The quantum-particle cell of claim 1 wherein the open cell defines a chamber configured to maintain a vapor pressure below $10^{-3}$ Torr with uniform spatial distribution, the multi-optics module, when inserted into the chamber, dividing the chamber into sub-chambers that are fluidically coupled to support a pressure differential between the sub-chambers.

15. The quantum-particle cell of claim 14 wherein the sub-chambers respectively define a two-dimensional magneto-optical trap (2D MOT) region and a three-dimensional magneto-optical trap (3D-MOT) region.

16. A product resulting from the process of claim 1.

17. The quantum-particle cell process of claim 1 wherein the open cell comprises: a region configured to surround the multi-optics module, and an open portion configured to receive the cover and comprising a portion of the sidewall to which the cover will be bonded.

18. The quantum-particle cell process of claim 1 wherein inserting the multi-optics module into the open cell comprises positioning at least a first optical element of the plural optical elements such that when the multi-optics module is mounted within the quantum-particle cell there is a first optical path between the first optical element and a transparent wall or window of the quantum-particle cell.

19. The quantum-particle cell process of claim 18 further comprising aligning an optical beam from an optical source along a second optical path into the quantum-particle cell that coincides with the first optical path after propagation through the transparent wall or window.

20. The quantum-particle cell process of claim 1 wherein the multi-optics module mounted within the quantum-particle cell forms an inner contained cavity within an outer cavity.

\* \* \* \* \*